United States Patent

[11] 3,578,202

| [72] | Inventor | Maurice Mainet<br>Asnieres, France |
| --- | --- | --- |
| [21] | Appl. No. | 873,986 |
| [22] | Filed | Nov. 4, 1969 |
| [45] | Patented | May 11, 1971 |
| [73] | Assignee | Produits Chimiques Pechiney-Saint-Gobain<br>Weuilly-sur-Seine, France |
| [32] | Priority | Nov. 8, 1968 |
| [33] | | France |
| [31] | | 173,070 |

[54] SEALING ASSEMBLY AND METHOD
30 Claims, 13 Drawing Figs.
[52] U.S. Cl. .................................................. 220/46, 215/40
[51] Int. Cl. ...................................................... B65d 53/00
[50] Field of Search .......................................... 220/46, 60; 215/40; 150/.5

[56] References Cited
UNITED STATES PATENTS

| 3,189,072 | 6/1965 | Starr | 220/60 |
| --- | --- | --- | --- |
| 3,298,415 | 1/1967 | Klygis | 220/60 |

*Primary Examiner*—George T. Hall
*Attorney*—McDougall, Hersh and Scott

ABSTRACT: Sealing elements and method for their assembly wherein the assembly comprises a first element having a body with at least one projection fixed thereto, wherein the projection is formed of a material which is deformable and which has an elastic memory, and a second element having at least one groove therein which is adapted to receive the projection of the first element whereby said projection is urged toward a sealing relation with the groove in response to the combination of forces generated by the elastic memory of the projection and by the internal pressures exerted on the sealing elements.

INVENTOR.
Maurice Mainet
BY McDougall, Hersh &
Scott

SEALING ASSEMBLY AND METHOD

This invention relates to a method of producing a tight seal between at least two independent elements, and the sealing assembly employed therein.

It is known that it is difficult to obtain a tight assembly or seal between two independent elements in order to form a hollow article, and also to achieve a tight partition in the interior of such hollow articles in a simple, durable and efficient manner. Up to the present, the practice has been to form seals between independent elements by welding, glueing, the interposition of a material which serves as a joint between the elements, and the like. All of such methods have a common disadvantage in that an additional operation in addition to positioning the element to be made integral and to eventual partitioning to be realized is required.

From the technical and economic standpoint, the ideal method for assembly of two separate elements would be to provide elements which can be tightly joined in an immediate, direct and systematic manner.

It is accordingly an object of the present invention to provide a sealing assembly characterized by a tight joint between separate and independent elements without the need to employ gaskets and similar aids.

Other objects and advantages of the invention will appear hereinafter, and, by way of illustration, and not by way of limitation, reference is made to the drawings wherein.

The features of the present invention reside in a method of assembling or joining at least two separate and independent elements to form tight hollow articles and/or tight partitions in hollow articles, and in the sealed or joined assembly resulting therefrom. In accordance with the practice of the invention, one of the elements comprises a body and at least one tonguelike projection fixed thereto, and the other element comprises a body having a groove in one surface thereof adapted to receive the projection of the first element in a sealing relation. The projection is formed of a deformable material having an elastic memory whereby the projection has a tendency to retain its original configuration.

The configuration of the groove of the other element is such that, when the projection is inserted into the groove, the projection is urged toward a tight sealing engagement with the groove by the combination of forces exerted on the projection by the mechanical forces arising from the resiliency of the projection and by the forces caused by internal pressures existing within the article, such as those exerted by a fluid confined within the article.

Thus, a tight seal between two independent elements can be achieved by simply inserting the projection on one of the elements into the groove contained in the other element, without employing various gaskets and the like which were heretofore required.

Figure 1:
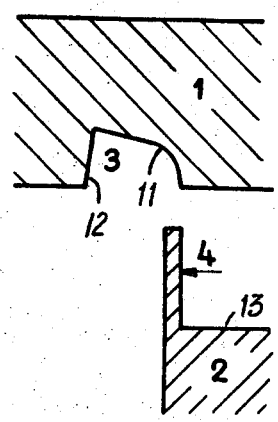
FIG. 1 is a sectional view of two elements embodying the features of the present invention prior to assembly.

Referring now to the drawings, there is shown in FIG. 1 a first element 1 and a second element 2 prior to their assembly to form a sealed article. As illustrated, element 1 representing a portion of a housing is provided with a groove 3 on one surface 10 thereof which groove is defined by an inclined surface 11, which is preferably curvilinear, to surface 10 and by another surface 12, which may be planar. Element 2, representing the other portion of a housing, is provided with a projection 4 formed of a deformable material which is preferably integral with element 2 and with a surface 13 adjacent to projection 4 which corresponds to surface 10 of element 1.

Figure 2:
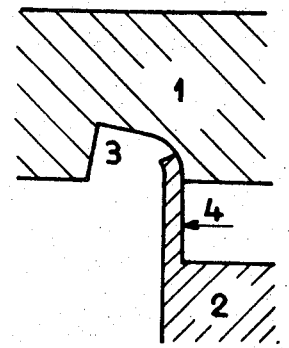
FIG. 2 is a sectional view of the embodiment shown in FIG. 1 at an intermediate stage of the assembly.

As is illustrated in FIG. 2, as element 1 and 2 are displaced toward each other, the end portion of projection 4 enters groove 3, and the curvilinear surface 11 thereof cause a deformation of projection 4 which operates to urge projection 4 tightly against curvilinear surface 11 to form a sealing engagement there between.

Figure 3:
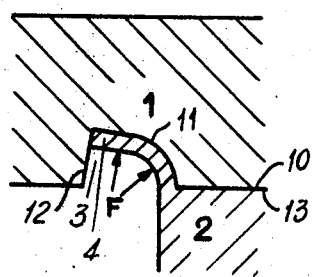
FIG. 3 is a sectional view of the embodiment shown in FIG. 1 wherein the elements are in an assembled or sealed position.

FIG. 3 illustrates the embodiment of FIGS. 1 and 2 wherein elements 1 and 2 are engaged in a sealing relationship. In the embodiment described, projection 4 is dimensioned to have a length corresponding to the linear dimension of curvilinear surface 11 whereby the end of projection 4 abuts the bottom of groove 3 formed by the intersection of surfaces 11 and 12. Due to the fact that projection 4 is deformable, its configuration corresponds to the curvilinear surface 11, and the lateral surface of projection 4 is maintained in contact therewith by the resiliency of the material forming the projection.

Element 3 is maintained in this position by reason of the internal pressures, such as those exerted by a confined fluid and represented by F in the drawing, present in the thus formed closed article, as well as by the abutting relation of surfaces 10 and 13. However, it will be understood by those skilled in the art that the same fitting or sealing relation between elements 1 and 2 can be achieved where projection 4 has a length less than the linear dimension of curvilinear surface 11 whereby the end of projection 4 does not abut the bottom of groove 3. It will also be understood by those skilled in the art that elements 1 and 2 may have any configuration so long as together they define a closed space, or a closed segment of an article where in the concepts of the invention are applied to form fluidtight partitions in an article.

As will be understood by those skilled in the art, the shape of the groove is essentially a function of the nature of the groove and of the forces exerted on the surfaces thereof by the deformably projection by reason of the elastic memory of the projection.

Figure 4:
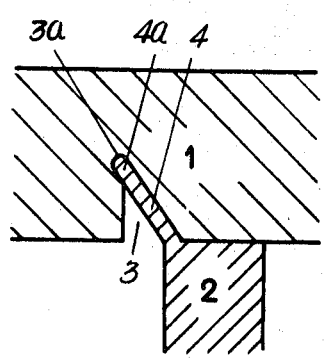
FIG. 4 is a sectional view of an alternative embodiment of the present invention.

In accordance with an alternative embodiment illustrated in FIG. 4, it is also possible to lock the projection in a secondary recess provided within groove 3. Thus, in this embodiment, the end 4a of projection 4 may be locked into a sealing position by means of a secondary recess 3a provided at the bottom of groove 3 which operates to securely retain projection 4 in sealing engagement with groove 3.

In accordance with the practice of the present invention it is generally preferred that the angle defined by the projection 4 before and after deformation by groove 3 be within the range of 1° to 90° and that the thickness of the projection 4 be between one-fifteenth and one-half the thickness of element 2. It is likewise generally desireable that the length of the projection be between one-third and 5 times the thickness of element 2.

In addition, in order to expedite assembly of the elements in accordance with the invention, it is generally preferred that surface 11 of groove 3 be curvilinear as shown in FIG. 1 and that the radius of curvature be preferably equal to or greater than the thickness of the projection.

A wide variety of materials have been found suitable for use in forming the deformable projection of the present invention including various rubbers and plastics, such as natural rubbers, silicone rubbers, polypropylenes, the latter having a good resistance to creep, polyethylenes, polyamides, polyacetals, polystyrenes, cellulosic derivatives, plasticized polyvinyl chlorides, copolymers of vinyl chloride with vinyl monomers and polytetrafluoroethylenes.

Figure 5:
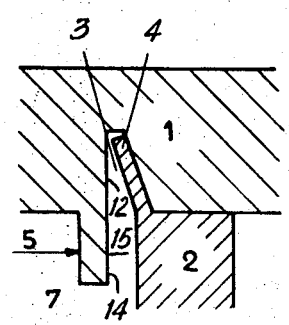
FIG. 5 is a sectional view of a further embodiment of the invention in a sealed position.

In accordance with a further embodiment of the invention, it has been found that the simple joint formed by elements of the type described in FIGS. 1–4 can be improved by means of a deflector 5 which is provided adjacent to surface 12 defining groove 3 as shown in FIG. 5. As is illustrated deflector 5 is integral with element 1 and has one surface which is coplanar with surface 12 of groove 3. The confined fluid occupies the space designated as 7.

Figure 6:
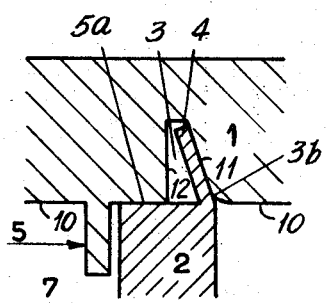
FIG. 6 is a sectional view of yet another embodiment of the invention.

Another variation of the embodiment described in FIG. 5 is shown in FIG. 6. In this embodiment groove 3 includes a hollow curvature or rounded shoulder at the intersection of surfaces 10 and 11 to facilitate inserting projection 4 into groove 3. Element 1 is also provided with a shoulder 5a, defined by a surface of element 1 between deflector 5 and groove surface 12, which serves to limit the depth to which projection 4 penetrates groove 3. In order to provide shoulder 5a in this embodiment, deflector 5 is offset from groove 3.

Figure 7:
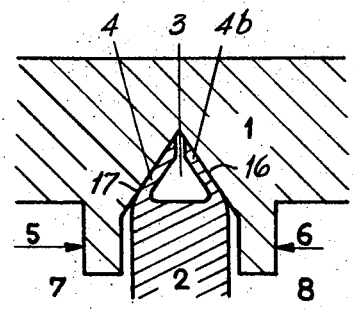
FIG. 7 is a sectional view of one embodiment of another concept of the invention.
Figure 8:
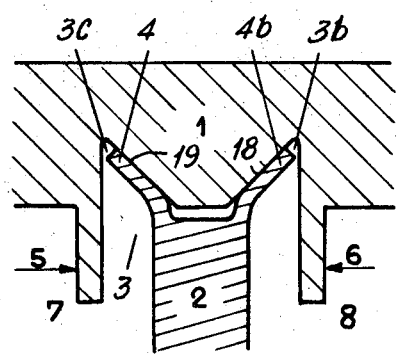
FIG. 8 is a sectional view of another embodiment illustrating the concept shown in FIG. 7.

In accordance with another concept of the present invention it is also possible to provide fluidtight partitions in a fluid containing article whereby the same or different fluids in the resulting compartments are not permitted to pass from one compartment to another. FIGS. 7 and 8 illustrate a concept that can be referred to as "double tightening."

As shown in FIG. 7, there is provided one element 1 which represents a portion of a fluid container housing having a groove or rabbet 3, and having a pair of deflector plates 5 and 6 provided in a spaced parallel relation along both edges of groove 3. Groove 3 has a continuously decreasing cross section to provide a groove having a cross section corresponding to an inverted V defined by inclined surfaces 16 and 17.

Element 2, representing a portion of a partition to be inserted into the housing defined by element 1, is provided with a pair of laterally spaced parallel tonguelike projections 4/4b formed of a deformable material having an elastic memory. Thus, when element 2 is inserted between deflectors plates 5/6, projections 4/4b enter groove 3 where projections 4/4b are deformed and displaced toward each other by means of inclined surfaces 17/16, respectively, in a tight sealing relation. The same or different fluids which occupy the areas designated as 7/8 on either side of element 2 are thus prevented from intermixing by virtue of the tight sealing relation created.

One possible variation on the embodiment shown in FIG. 7 is illustrated in FIG. 8 wherein groove 3 comprises a groove having a generally M-shaped cross section as defined by opposing inclined divergent surfaces 18 and 19 and by deflector plates 5 and 6. In this embodiment, projections 4 and 4b are deformed and displaced in opposite directions away from each by surfaces 19 and 18, respectively, into grooves 3c and 3b, respectively, whereby the projections are biased against these surfaces by reason of their resiliency to form a fluidtight seal to separate fluids 7 and 8.

Figure 9:
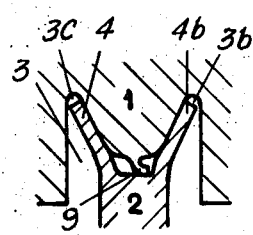
FIG. 9 is a sectional view of yet another embodiment of the concept illustrated in FIGS. 7 and 8.

One alternative to the embodiment shown in FIG. 8 is the embodiment depicted in FIG. 9 where element 1 is provided with an integral safety spline at the vertex of the M. This spline operates to limit the depth to which projections 4 and 4b penetrate groove 3c and 3b, respectively, to insure a tighter seal between elements 1 and 2.

Figure 10:
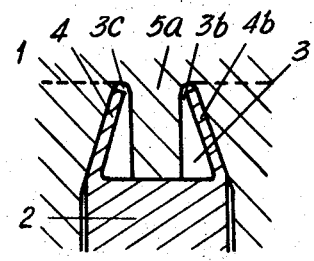
FIG. 10 is a sectional view of a further embodiment of the concepts illustrated in FIGS. 7 to 9.
Figure 11:
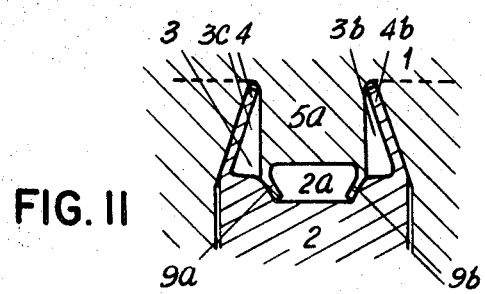
FIG. 11 is a sectional view of an alternative embodiment to the embodiment illustrated in FIG. 10.

FIGS. 10 and 11 illustrate in section the details of additional embodiments wherein the projections are integral with element 2 and the safety spline integral with element 1.

As shown in FIG. 10, element 1 is provided with an integral shoulder member 5a projecting into groove 3 to divide groove 3 into separate grooves 3b and 3c. Element 2 having projections 4 and 4b integral therewith is assembled with element 2 whereby projections 4 and 4b are inserted into grooves 3c and 3b, respectively, to form a tight sealing relation therewith. The top of element 2 abuts shoulder member 5a to limit the depth to which projections 4 and 4b penetrate grooves 3c and 3b, respectively.

In the embodiment shown in FIG. 11, element 1 is provided with an integral shoulder member 5a which serves to divide groove 3 into grooves 3c and 3b having convergent inclined walls. Shoulder member 5a is provided at its end with two parallel, laterally spaced deformable splines 9a and 9b. Element 2 is provided with a pair of parallel, laterally spaced projections 4 and 4b extending into grooves 3c and 3b, respectively, in sealing engagement therewith. On the body of element 2 between projections 4 and 4b is a groove 2a having a contour such that it causes splines 9a and 9b to be deformed in sealing engagement with groove 2a to form a second seal, in addition to that formed by projections 4 and 4b. This seal eliminates any risk of leakage, even in cases where the mounting of elements 1 and 2 is imperfect.

Figure 12:
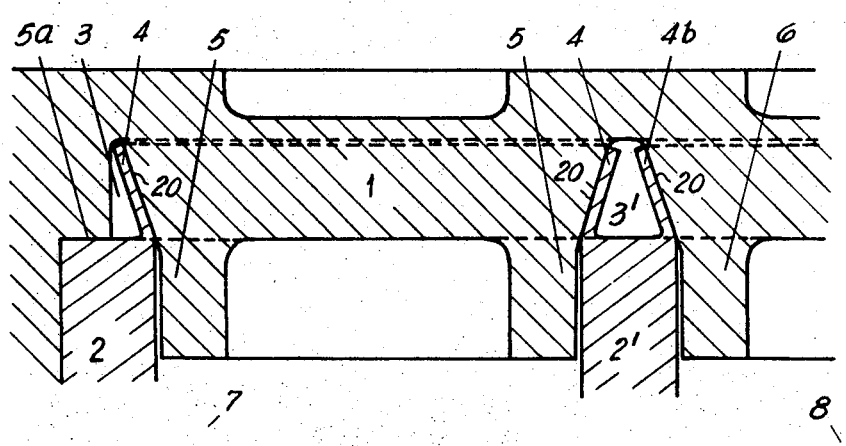
FIG. 12 is a sectional view of another embodiment illustrating the concepts of the present invention; and, FIG. 13 is a plan view of one of the elements shown in FIG. 12.
Figure 13:
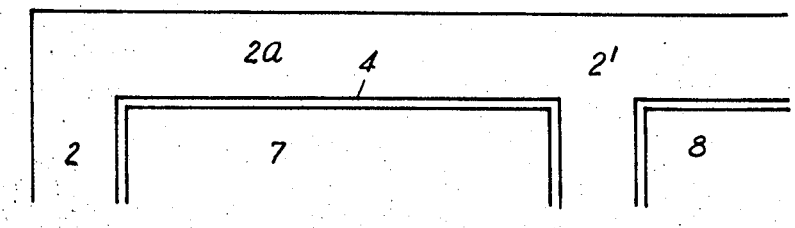

The elements embodying the concepts of the present invention can be in the form of a rectangular container or the like having at least one sealed inside partition in order to separate fluids which may be contained in spaces 7 and 8 as shown in FIGS. 12 and 13.

In FIG. 12, the container comprises a cover element 1 defining deflectors 5 and 6 which are preferably integral therewith and which have a generally hollow rectangular profile. Cover element 1 also defines two or more continuous grooves 3 defined by at least one inclined surface 20 and having a generally triangular cross section and a rectangular profile for each compartment to be formed. The groove 3' adapted to receive the projections of a partition element 2 separating two compartments is formed by two grooves which communicate with each other whereby grooves 3' has a trapezoidal cross section.

Element 2 comprises a housing which complements cover element 1 to define a closed container, and, as shown in FIG. 13, has a rectangular profile with two or more hollow center spaces 7 and 8. Thus, partition 2 forms one partition and partition 2' forms the partition separating spaces 7 and 8 with partitions 2 and 2' being connected by means of sidewall 2a. Element 2 is provided with two or more deformable continuous projections 4 and 4b having an elastic memory having a generally rectangular profile, with each profile circumscribing each compartment of the container.

Returning to FIG. 12, in order to form a fluidtight container, it is necessary to insert projection 4 into groove 3 and projections 4 and 4b into groove 3' whereby the projections are deformed by and are maintained in sealing engagement with surfaces 20 of grooves 3 and 3' to form fluidtight compartment 7 and 8. The cover element is provided with a shoulder 5a which abuts the top surface of element 2 to control the depth to which projections 4 and 4b penetrate grooves 3 and 3'.

It will be understood by those skilled in the art that the concepts of the present invention provide means for achieving a tight sealing relationship between at least two independent elements. The concepts of the present invention have been found to be particularly well suited to the manufacture of accumulator boxes, sealed containers for the conservation of foods in refrigerators and the like, fluidtight enclosures of electrical equipment and containers or tanks adapted to contain different fluids. The sealing elements of the present invention provide a tight seal which can be assembled without the need to employ gaskets and the like. It will also be understood that the concepts of the present invention may also be applied to effecting tight joints between different materials.

It will be understood that various changes may be made in the details of construction and assembly without departing from the spirit of the invention, especially as defined in the following claims.

I claim:

1. An assembly for forming hollow articles and compartments adapted to contain fluids comprising a first element having a body with a least one projection fixed thereto, said projection being formed of a material which is deformable and has an elastic memory, and a second element having at least one groove in at least one surface thereof, said groove being adapted to receive said projection whereby said projection is urged toward a sealing relation with said groove in response to the combination of forces generated by the elastic memory of said projection and by the internal pressure within said article when said elements are joined to form a sealed article.

2. An assembly as defined in claim 1 wherein said internal pressures are exerted by a fluid confined in said article.

3. An assembly as defined in claim 1 wherein said first element includes adjacent to said projection corresponding to said one surface of said second element, whereby said surfaces are in an abutting relation when said projection is engaged in said grove.

4. An assembly as defined in claim 1 wherein said groove is defined by at least one inclined surface, said inclined surface being adapted to laterally displace said projection whereby a lateral face of said projection is urged against said inclined surface in a sealing relation therewith in response to the resiliency of said projection when said projection is engaged with said groove.

5. An assembly as defined in claim 4 where said projection is displaced at an angle within the range of 1° to 90°.

6. As assembly as defined in claim 4 wherein said inclined surface has a curvilinear contour.

7. An assembly as defined in claim 4 wherein said inclined surface is dimensioned to correspond to the length of said projection whereby the end of said projection abuts the bottom of said groove.

8. An assembly as defined in claim 1 wherein said groove includes means to lock said projection in sealing engagement with said groove.

9. An assembly as defined in claim 8 wherein said means includes a recess within said groove to securely retain said projection in said groove.

10. An assembly as defined in claim 1 wherein the thickness of said projection falls within the range of one-fifteenth to one-half times the thickness of said first element.

11. An assembly as defined in claim 1 wherein the length of said projection ranges between one-third and 5 times the thickness of said first element.

12. An assembly as defined in claim 1 which includes a deflector, said deflector being provided on said one surface of said second element adjacent to said groove.

13. An assembly as defined in claim 12 wherein said deflector has one surface, said surface being coplanar with one of the surfaces defining said groove.

14. An assembly as defined in claim 1 wherein said groove is defined by at least two surfaces, at least one of said surfaces being inclined with respect to the other surface.

15. An assembly as defined in claim 14 wherein said one surface has a curvilinear contour and the radius of curvature is preferably equal to or greater than the thickness of the projection.

16. An assembly as defined in claim 14 wherein said other surface is substantially perpendicular to the plane of said second element.

17. An assembly as defined in claim 14 wherein said first element includes two projections, said projections being parallel and laterally spaced on one surface of said second element to form a space between said projections.

18. An assembly as defined in claim 17 wherein both of said surfaces are inclined toward each other to form a groove having a V-shaped cross section whereby said projections on said first element are deformed in a direction toward each other in sealing engagement with said surfaces when said projections are inserted in said groove.

19. An assembly as defined in claim 18 which includes two deflectors, said deflectors being parallel and laterally spaced on either side of said groove.

20. An assembly as defined in claim 17 wherein both of said surfaces are inclined away from each other to form a groove having an M-shaped cross section whereby said projections are deformed in a direction away from each other in sealing engagement with said surfaces when said projections are inserted in said groove.

21. An assembly as defined in claim 20 which includes a spline integral with said second element, said spline being formed of a deformable material and being positioned at the vertex of said M-shaped cross section.

22. An assembly as defined in claim 20 which includes two deflectors, said deflectors being parallel and being laterally spaced on either side of said groove.

23. An assembly as defined in claim 17 which includes a shoulder element, said shoulder element being integral with said second element and projecting into said groove and projecting into said space between said projections to abut said surface of said first element to limit the depth to which said projections penetrate said groove.

24. An assembly as defined in claim 23 wherein said shoulder element includes a pair of laterally spaced parallel deformably splines and said space between said projections includes a recess in said surface of said first element, said recess being adapted to receive said splines in sealing relation therewith when said projections are inserted in said groove.

25. An assembly as defined in claim 1 wherein said first element defines at least one compartment, said projection circumscribing said compartment, and wherein said groove is a continuous groove having a profile corresponding to the profile of said projection whereby said first and second elements define a closed compartment when said projection is inserted in said groove.

26. An assembly as defined in claim 25 wherein said first element defines at least two compartments, said first element having one projection circumscribing each compartment, and said second element defines a cover for said first element, said second element defining a continuous groove corresponding to each projection of said first element.

27. THe method of forming a fluidtight seal which comprises providing a first element having a body with at least one projection fixed thereto, said projection being formed of a material which is deformable and which has an elastic memory and a second element having at least one groove in at least one surface thereof, said groove being adapted to receive said projection, inserting said projection into said groove to thereby deform said projection whereby said projection is urged toward a sealing relation with said groove in response to the combination of forces generated by the elastic memory of said projection and by the internal pressure against the seal.

28. A method as defined in claim 27 wherein said projection is displaced during deformation by an angle within the range 1° to 90°.

29. A method as defined in claim 27 wherein said first element includes a pair of laterally spaced projections whereby said projections are displaced toward each other during deformation.

30. A method as defined in claim 27 wherein said first element includes a pair of laterally spaced projections whereby said projections are displaced away from each other during deformation.